United States Patent
Song et al.

(10) Patent No.: US 8,553,369 B2
(45) Date of Patent: Oct. 8, 2013

(54) MAGNETIC ELEMENT WITH IMPROVED STABILITY AND INCLUDING AT LEAST ONE ANTIFERROMAGNETIC TAB

(75) Inventors: Dion Song, Eden Prairie, MN (US); Mark William Covington, Edina, MN (US); Qing He, Plymouth, MN (US); Dimitar Velikov Dimitrov, Edina, MN (US); Wei Tian, Eden Prairie, MN (US); Wonjoon Jung, Eden Prairie, MN (US); Sunita Bhardwaj Gangopadhyay, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 305 days.

(21) Appl. No.: 12/956,752

(22) Filed: Nov. 30, 2010

(65) Prior Publication Data

US 2012/0134057 A1 May 31, 2012

(51) Int. Cl.
*G11B 5/39* (2006.01)

(52) U.S. Cl.
USPC .................................... 360/324.12

(58) Field of Classification Search
USPC .......... 360/319, 324.1, 324.11, 324.12, 324.2
See application file for complete search history.

(56) References Cited

U.S. PATENT DOCUMENTS

| | | | |
|---|---|---|---|
| 5,408,377 A | 4/1995 | Gurney et al. | |
| 5,576,914 A | 11/1996 | Rottmayer et al. | |
| 6,219,211 B1 * | 4/2001 | Gill | 360/324.11 |
| 6,430,015 B2 | 8/2002 | Ju et al. | |
| 6,469,878 B1 * | 10/2002 | Mack et al. | 360/324.12 |
| 6,943,997 B2 * | 9/2005 | Gill | 360/324.12 |
| 7,035,062 B1 | 4/2006 | Mao et al. | |
| 7,061,725 B2 | 6/2006 | Seigler | |
| 7,166,173 B2 * | 1/2007 | Beach | 148/108 |
| 7,382,589 B2 | 6/2008 | Lin et al. | |
| 2002/0034057 A1 * | 3/2002 | Noma et al. | 360/324.12 |
| 2004/0109265 A1 * | 6/2004 | Gill | 360/324.12 |
| 2004/0207963 A1 * | 10/2004 | Gill | 360/324.12 |

* cited by examiner

*Primary Examiner* — Jefferson Evans
(74) *Attorney, Agent, or Firm* — Hall Estill Attorneys at Law

(57) ABSTRACT

A magnetic element capable of detecting changes in magnetic states, such as for use as a read sensor in a data transducing head or as a solid-state non-volatile memory element. In accordance with various embodiments, the magnetic element includes a magnetically responsive stack or lamination with a first areal extent. The stack includes a spacer layer positioned between first and second ferromagnetic free layers. At least one antiferromagnetic (AFM) tab is connected to the first free layer on a surface thereof opposite the spacer layer, the AFM tab having a second areal extent that is less than the first areal extent.

20 Claims, 6 Drawing Sheets

MAGNETIC ELEMENT WITH IMPROVED STABILITY AND INCLUDING AT LEAST ONE ANTIFERROMAGNETIC TAB

SUMMARY OF THE INVENTION

Various embodiments of the present invention are generally directed to a magnetic element capable of detecting changes in magnetic states.

In accordance with various embodiments, a magnetic element includes a magnetically responsive stack or lamination with a first areal extent. The stack includes a spacer layer positioned between first and second ferromagnetic free layers. At least one antiferromagnetic (AFM) tab is connected to the first free layer on a surface thereof opposite the spacer layer, the AFM tab having a second areal extent that is less than the first areal extent.

Other embodiments include a magnetically responsive stack with a first areal extent and is constructed with a spacer layer positioned between first and second ferromagnetic free multi-layer structures that each have a $Co_xFe_{1-x}$ layer coupled to the spacer layer, a $(Co_xFe_{1-x})_yB_{1-y}$ layer coupled to the AFM tab, and a $Ni_xFe_{1-x}$ layer disposed between the $Co_xFe_{1-x}$ and $(Co_xFe_{1-x})_yB_{1-y}$ layers. At least one antiferromagnetic (AFM) tab is coupled to the first free layer on a surface thereof opposite the spacer layer with the AFM tab having a second areal extent that is less than the first areal extent.

In another exemplary embodiment, a non-magnetic tunneling barrier layer is disposed between a first ferromagnetic free layer and a second ferromagnetic free layer with a first areal extent. At least one antiferromagnetic (AFM) tab is connected to the first or second free layers on a surface thereof opposite the spacer layer and spaced an offset distance away from an air bearing surface of the first free layer.

These and other features and advantages which characterize the various embodiments of the present invention can be understood in view of the following detailed discussion and the accompanying drawings.

DETAILED DESCRIPTION

Figure 1:
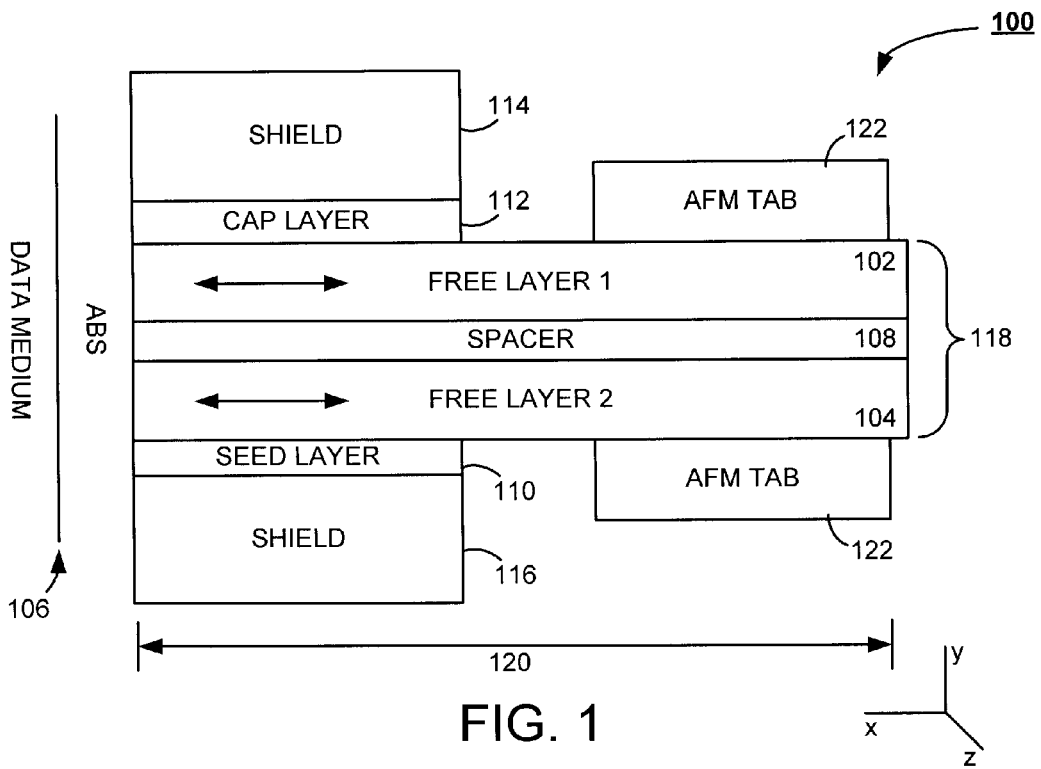
FIG. 1 generally illustrates an exemplary magnetic element capable of being used as a read sensor.

The present disclosure generally relates to magnetic elements capable of detecting magnetic fluctuations, such as in the context of read sensors used in data transducing heads and magnetic memory elements used to provide non-volatile storage of data. As electronics devices become more sophisticated, demand for higher data capacity and improved data transfer rates have placed added emphasis on the speed and reliability of data sensing elements. With a large segment of data storage being conducted through the use of magnetic storage, magnetic stabilization of the data sensing elements that are sensitive to changes in magnetic fluctuations plays an ever important role.

Accordingly, various embodiments of the present invention are generally directed to a magnetic element having an increased magnetic stabilization through the use of an antiferromagnetic (AFM) tab coupled to one or more free layers. The AFM tab can be positioned on an extended stripe height portion of the free layers so that shape anisotropy corresponding to the larger areal extent of the free layers provides greater magnetic stabilization. The position of the AFM tab offset from an air bearing surface (ABS) can allow for a smaller shield-to-shield spacing FIG. 1 displays an exemplary block representation of a magnetic element 100 capable of being used as a read sensor in a data transducing head of a data storage device. The element 100 includes first and second ferromagnetic free layers 102 and 104 that are each sensitive to external magnetic fields. Each free layer 102 and 104 can have independent or common magnetizations that correspond to an encountered external magnetic field, such as provided by programmed magnetic bits on a data storage media 106.

The free layers 102 and 104 are separated by a non-magnetic spacer layer 108 that can be constructed with a variety of thicknesses to accommodate desired free layer magnetic sensing. In some embodiments, the spacer layer 108 is a tunneling barrier layer. The free layers 102 and 104 can each further be coupled to an electrode layer, such as seed layer 110 and cap layer 112. The composition, shape, and placement of the electrode layers are not limited and can be modified as desired.

The magnetic element 100 further optionally includes shield layers 114, 116 attached to the electrode layers on opposite sides of the free layers 102 and 104. The shield layers 114 and 116 can be oriented in a variety of formations and compositions to direct unwanted magnetic flux away from the free layers 102 and 104. Such shielding can allow for improved magnetic sensing of programmed bits from media 106 by eliminating noise and inadvertent sensing of adjacent bits.

As shown in FIG. 1, a laminated sensing stack 118 is made up of the spacer 108 and free layers 102 and 104 has an elongated stripe height 120 that corresponds with a first areal extent compared to the shields 114 and 116 and electrode layers 110 and 112 that each have a smaller areal extent and stripe height. The longer stripe height 120 of the sensing stack can enhance the magnetic sensing of data bits by providing increased performance with robustness against operational variability. Such increased performance can allow for improved magnetic sensing of external bits by maintaining a stronger magnetization in response to those external bits.

With the free layers 102 and 104 each being sensitive to external magnetic fields, sensing of external bits would be difficult without a default magnetic orientation to use as a reference. In various embodiments, an antiferromagnetic (AFM) tab 122 is coupled to one or both of the free layers 102 and 104 to influence the magnetic orientation of the free layer and provide a default magnetic reference. The AFM tab 122 can maintain one or both of the free layers 102 and 104 in a predetermined magnetic orientation through an exchange bias associated with the AFM material that can be overcome in the presence of an external magnetization above a predetermined threshold.

For example, the first free layer 102 can have a default magnetization of a first direction imparted by the AFM tab 122 which is reversed to a second direction in response to an external magnetization and which is greater than the magnetization imparted from the tab 122. It should be noted that the magnetization directions and magnitudes of the AFM tab 122 and free layers 102 and 104 can be configured as needed for a desired performance of the magnetic element 100.

Figure 2:
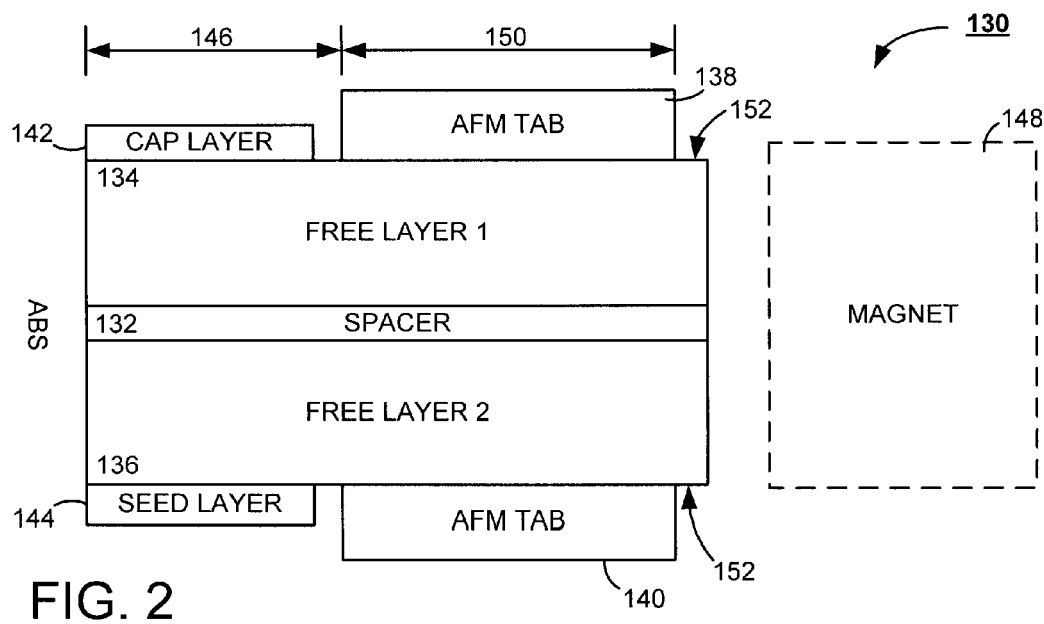
FIG. 2 shows a portion of the exemplary magnetic element of FIG. 1 as constructed and operated in accordance with various embodiments of the present invention.

One exemplary magnetic element configuration is displayed with a magnetic stack 130 of FIG. 2. A spacer or tunneling barrier layer 132 separates first and second free layers 134 and 136, each free layer is attached to independent AFM tabs 138 and 140. The AFM tabs are each offset and separated from an air bearing surface (ABS) so that cap or seed electrode layers 142 and 144 respectively lie between the ABS and the AFM tabs 138 and 140. As such, the AFM tabs 134 and 136 do not contact or approach the ABS and are coupled to the free layers 134 and 136 at an offset distance 146 measured from the ABS.

With the AFM tabs 138 and 140 offset from the ABS, the thickness of the stack 130 at the ABS can be minimized to allow for higher linear density applications. Attachment of the AFM tabs 138 and 140 along the stripe height of the stack 130 allows for the shape anisotropy associated with the free layers 134 and 136 to efficiently interact with the exchange bias magnetization of the AFM tabs to set a predetermined default magnetization in the absence of an external magnetization above the predetermined threshold.

As shown in FIG. 2, the first and second free layers 134, 136 and the intervening spacer layer 132 form a magnetically responsive lamination (or stack) with a first areal extent. This first areal extent represents the surface area of the lamination along its major (largest) axes, such as would be viewed from above or below the lamination.

The AFM tabs 138 and 140 are coupled to opposing sides of the intervening lamination and are each provided with a second areal extent. This second areal extent is in facing relation to, and is less than, the first areal extent of the lamination. This provides an offset distance 146 for the AFM tabs with respect to the lamination, as shown. In at least some embodiments, the AFM tabs 138, 140 will have a tab length 138 that is greater than the offset distance 146. For reference, an exemplary stripe thickness of the free layers may be on the order of about 300 nanometers, nm and an exemplary offset distance may be on the order of about 50 nm. It will thus be appreciated that the drawings are not necessarily drawn to scale.

The sizing of the areal extent of the AFM tabs 138 and 140 relative to the free layers 134, 136 is selected to influence the magnetization of the free layers 134 and 136 and may vary depending on the requirements of a given application. Generally, the AFM tabs extend only adjacent a portion of the free layers away from the ABS, thereby creating a uniform exchange bias field along a portion of a top surface of each of the free layers. In some embodiments, a permanent magnet 148 is configured with the AFM tabs 138 and 140 to magnetically influence the free layers 134 and 136 to maintain a predetermined default magnetization.

The stack 130 of FIG. 2 is merely an exemplary configuration which is not limiting. Various modifications to the materials, orientations, and configurations can be made to the aspects of the stack 130 as needed or desired. For example, a single AFM tab could be configured with a tab length 150 that is greater than the thickness of the first free layer 164, where the thickness is measured perpendicular from the top surface 152. Alternatively, opposing AFM tabs may be provided with different areal extents.

Figure 3:
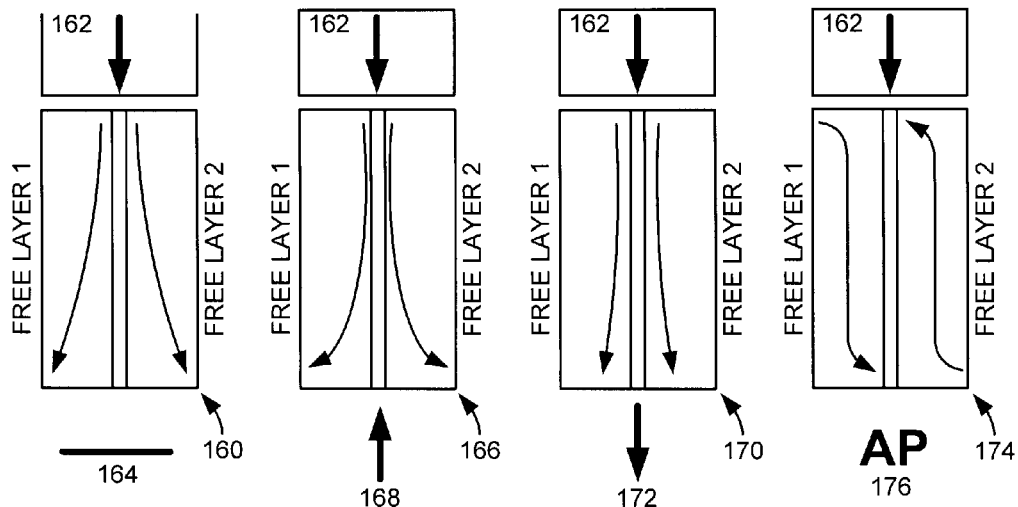
FIG. 3 displays exemplary operational characteristics of the magnetic element of FIG. 2.

FIG. 3 generally illustrates a number of magnetic stacks in response to a variety of exemplary external magnetization with the use of a rearward magnet and without the use of an AFM tab. Stack 160 displays the first and second free layers with a default magnetic orientation set by the bias magnetization from the magnet 162. The magnetically neutral external field 164 does not influence the default magnetization of the stack 160 as the magnetizations of each free layer cant towards the corners in order to minimize the magneto static interaction energy.

When the free layers encounter an external magnetization in a first upward direction that is greater than the default magnetization imposed by the magnet 162, as shown by stack 166 and magnetization 168, the magnetization of the free layers further cant towards the corners in a manner that can be sensed to correspond to a logical state, such as 0 or 1.

A magnetic stack 170 illustrates how an external magnetization 172 of a second downward direction and above the default magnetization of the magnet 162 affects the magnetization of the free layers. The free layer magnetizations decrease the cant towards the corners and become more parallel as the external magnetization 172 matches the direction of the bias field from the magnet 162. As with the free layer magnetizations of stack 166, the affect of external magnetization 172 can be sensed and differentiated from the default magnetization of stack 162 to read a logical state.

While operation of the dual free layer stacks 160, 166, and 170 can be sensed by a variety of different manners, such as, but not limited to, tunneling magneto resistive (TMR), giant magneto resistive (GMR), and anisotropic magneto resistive (AMR) effects depending on the configuration of the spacer layer between the free layers, magnetic instability can occur when one of the free layers inadvertently switches magnetization direction, as shown in stack 174. Such a switch in magnetization can be referred to as an AP state 176 in which high resistance and very small output response makes it unsuitable to read external data bits.

A switch to an AP state 176 can occur in response to various characteristics like heat and relatively strong external fields and can result in catastrophic failure of a data transducing head. As such, the inclusion of the AFM tabs of FIGS. 1 and 2 can create exchange bias fields that stabilize the magnetization of the free layers while not adversely adding thickness to the magnetic stack. Furthermore, by recessing the AFM tabs a distance away from the ABS, the exchange bias fields do not affect the magnetic response of the free layers at the ABS.

The placement of the AFM tabs along the top surface of each of the free layers further allows for the exchange bias fields to be perpendicular to the ABS, in contrast to a magnet oriented to the rear of the free layers. The configuration of the AFM tabs as shown in FIGS. 1 and 2 can also allow for manipulation of the stripe height of the free layers and tab length to create various exchange bias strength that can set the default magnetization and magnetization threshold of the free layers. Consequently, the configuration of an AFM tab that has a relatively large areal extent, such as at least half of the stripe height, can result in the free layers returning to the default magnetization despite thermal or magnetic excitations.

Figure 4:
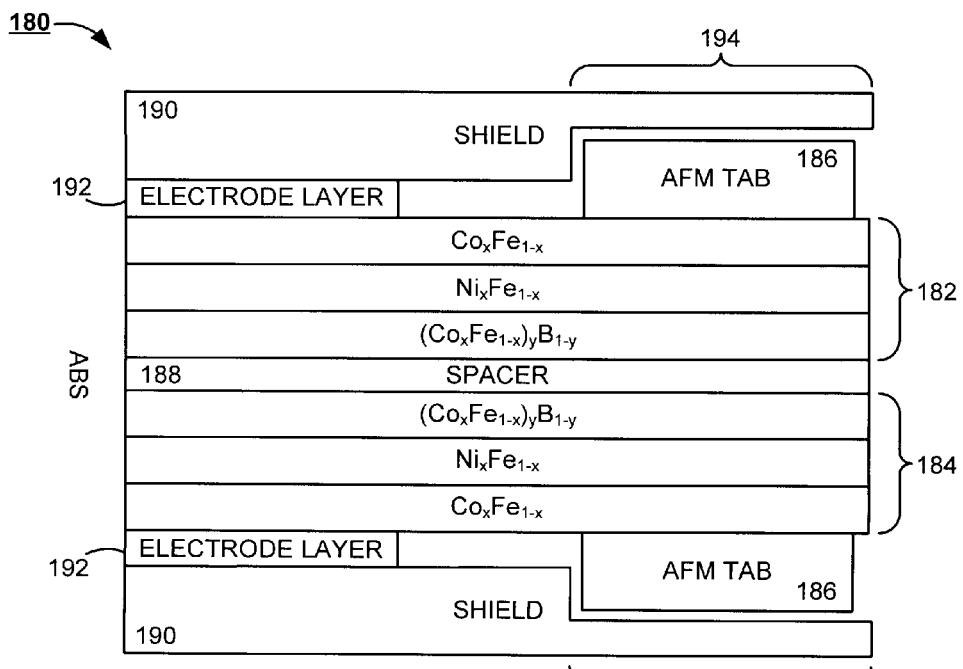
FIG. 4 shows an exemplary magnetic element constructed and operated in accordance with various embodiments of the present invention.

FIG. 4 displays an exemplary magnetic element 180 constructed in accordance with various embodiments of the present invention. The element 180 has a pair of ferromagnetic free multi-layers 182 and 184 that each are independently sensitive to magnetic fields. That is, each free multi-layer 182 and 184 can have a net magnetization in the same manner as the free layers of FIGS. 1 and 2. As shown in FIG. 4, a free multi-layer can be constructed with a $Co_xFe_{1-x}$ ferromagnetic free layer that is coupled to a first AFM tab 186, a $Ni_xFe_{1-x}$ middle layer, and a $(Co_xFe_{1-x})_yB_{1-y}$ ferromagnetic free layer coupled to a spacer 188.

As can be appreciated, the chemical compositions of the layers of the free multi-layers 212 and 214 can vary and the X and Y variables denote the atomic or weight concentrations of each of the elements that range from 0% to 100%. One exemplary construction of the multi-layers 182 and 184 results in a $NiFe_4$ middle layer disposed between $CoFe_{30}$ and $CoFe_{48}B_{20}$ ferromagnetic free layers. However, such a multi-layer construction is not required or limited as the X and Y variables can be selectively modified within any range, as desired.

In another exemplary embodiment, the layers can be amorphous, nano-crystalline, or crystalline in nature with either face centered cubic (FCC) or body centered cubic (BCC) lattice structures. Such variety and construction of the free multi-layers 182 and 184 allows the exchange bias field of the AFM tabs to more efficiently influence and stabilize the magnetization of the free multi-layers.

The free multi-layers can be used in conjunction with the free layers of FIGS. 1 and 2 or independently as the free magnetic sensing layers, as displayed in FIG. 4. Use of the multi-layers 182 and 184 can yield a large exchange bias, such as greater than 700 Oe, while enabling a proper coercive field, such as about 200 Oe. Thus, coupling the AFM tab 186 with the free multi-layers can enhance the accuracy and durability of the magnetic element 180 through improved magnetic stabilization.

The placement of the $Co_xFe_{1-x}$ ferromagnetic free layer farthest from the spacer layer 188 can allow for more efficient deposition of the AFM tab 186 due to the crystalline structure of $Co_xFe_{1-x}$. Such crystalline structure can further provide an interface in which the exchange coupling of the AFM tab 186 can be enhanced. Specifically, when the AFM tab 186 is constructed of materials such as $Ir_xMn_{1-x}$, $Pt_xMn_{1-x}$, NiCo, and $(Ni_xCo_{1-x})O$, the exchange bias field between the $Co_xFe_{1-x}$ of the free multi-layer 182 and 184 and the AFM tab 186 is operationally increased.

Figure 5A:
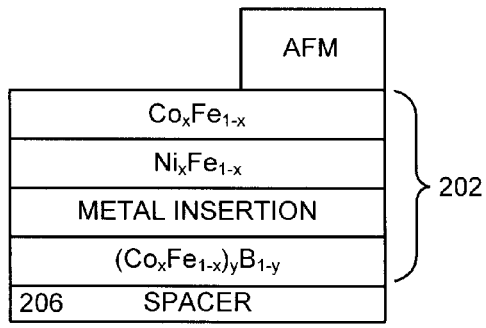
FIGS. 5A-5C generally illustrate portions of exemplary magnetic stacks capable of being used in the magnetic element of FIG. 4
Figure 5B:
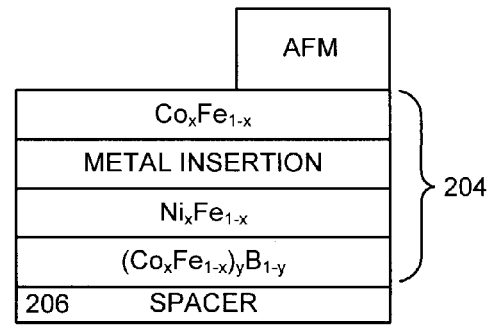
Figure 5C:
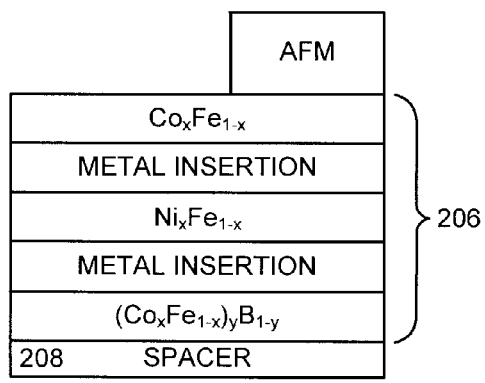

FIGS. 5A-5C each display portions of a magnetic stack capable of being used in the magnetic element of FIG. 4. In FIG. 5A, the free multi-layer 202 is constructed with a metal insertion layer between the $Ni_xFe_{1-x}$ and $(Co_xFe_{1-x})_yB_{1-y}$ layers. A metal insertion layer can also be placed between the $Co_xFe_{1-x}$ and $Ni_xFe_{1-x}$ layers, as displayed in the multi-layer 204 FIG. 5B. The configuration of the magnetic stack 200 is not limited to a single metal insertion layer. FIG. 5C illustrates such a multi-layer 206 that has the $Ni_xFe_{1-x}$ layer disposed between a pair of metal insertion layers.

It should be noted that the multi-layers 202-206 shown in FIGS. 5A-5C are merely exemplary and provide only one portion of a magnetic stack that is on one side of the spacer or tunneling barrier layer 208. As such, a magnetic stack that employs metal insertion layers can have any of the multi-layer configurations of FIGS. 5A-5C on one, or both, sides of the spacer layer 208. However, it has been observed that the insertion of a metal layer as displayed in FIGS. 5A-5C can provide enhanced bias magnetizations of greater than 400 Oe.

The composition and thickness of the metal insertion layers are not limited, but can be a variety of different metals, such as Ta, Hf, La, Ti, and W. The insertion of the metal layers can dilute the magnetic moment of the free multi-layers 212 and 214 and increase the overall exchange bias field influencing the multi-layers. In one exemplary use of the metal layers, a solid Ta layer is configured with a thickness of a less than 0.2 nanometers and is placed between the $Co_xFe_{1-x}$ and $Ni_xFe_{1-x}$ layers while an Ti alloy layer is installed between the $Ni_xFe_{1-x}$ and $(Co_xFe_{1-x})_yB_{1-y}$ layers with a thickness of greater than 0.2 angstroms.

Returning to FIG. 4, the free multi-layers 182 and 184 are each coupled to a magnetic shield 190 through an electrode layer 192 that is disposed between the ABS and the AFM tabs 186. The shields 190 can each be configured with a region of reduced thickness 194 that is adapted to house the AFM tabs 186. With the enhanced magnetic stabilization achieved with the coupling of the AFM tabs 186, the shields 190 can provide adequate protection to unwanted magnetic flux while having a reduced thickness region 194. As shown, the thickness of the shields 190 is greatest at the ABS to provide the maximum magnetic protection for the free multi-layers against stray magnetizations, such as adjacent media tracks.

Figure 6:
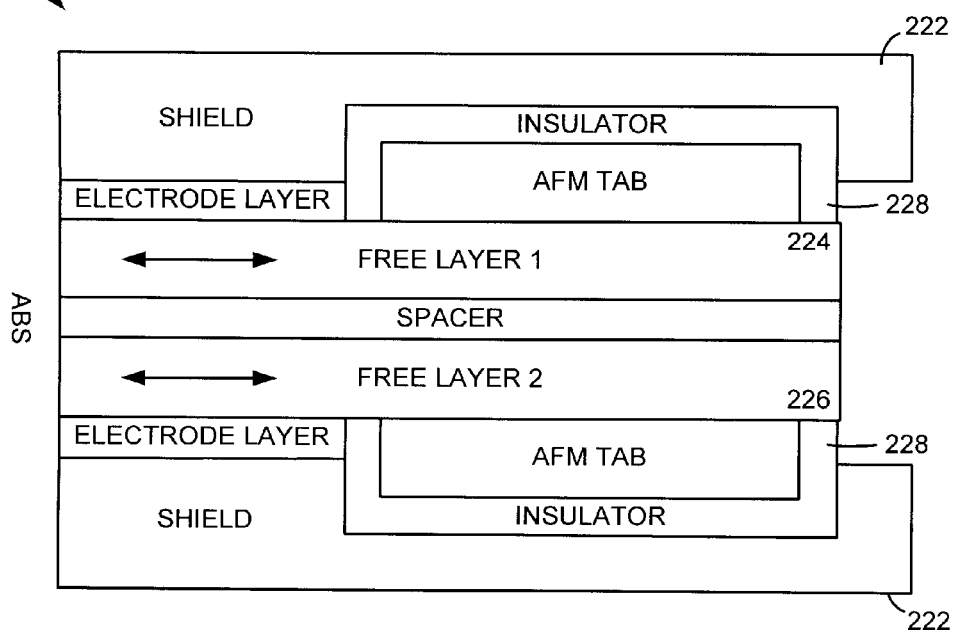
FIG. 6 provides an exemplary magnetic element constructed and operated in accordance with various embodiments of the present invention.

In the exemplary magnetic element 220 shown in FIG. 6, the reduced thickness region of the shields 222 does not extent to beyond the stripe height of the first and second free layers 224 and 226. The reduced thickness region is further filled with an insulating material 228 that can reduce the exchange bias field from creating shunting resistance in parallel to the free layers 224 and 226. As a result, the insulating material 228 provides a larger amplitude readback signal loss due to the reduction in shunt resistance.

While the shields 222 extent beyond the stripe height of the free layers 224 and 226 to shield a rear portion of the AFM tabs 230, such configuration can be changed to accommodate greater or lesser shielding. For example, the shields 222 could meet behind the free layers 224 and 226 opposite the ABS or contain other areas of reduced thickness to house a rear positioned magnet, such as the magnet of FIG. 2.

Figure 7:
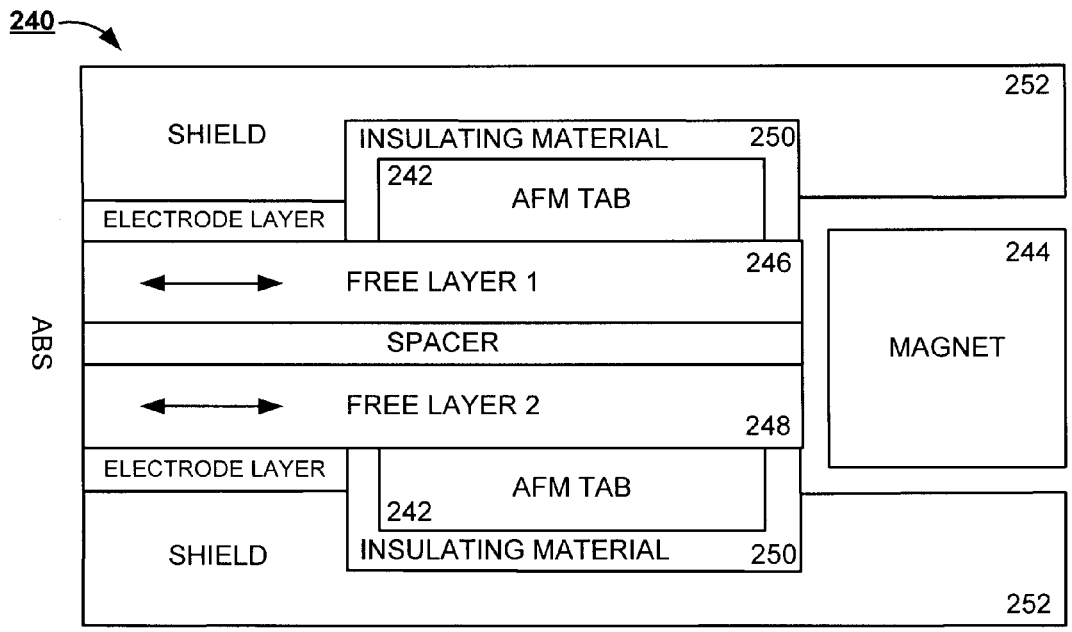
FIG. 7 shows an exemplary magnetic element constructed and operated in accordance with various embodiments of the present invention.

FIG. 7 displays such an exemplary magnetic element 240 with both AFM tabs 242 and a magnet 244 positioned on perpendicular surfaces of the first and second free layers 246 and 248. With dual bias fields affecting each free layer 246 and 248, the tab length and areal extent of the AFM tabs 242 may be modified to set a predetermined default magnetization and magnetization threshold. While the insulating material 250 is shown exclusively about the AFM tabs 242, that material can be extended to encompass the magnet 244 and insulate the space between the shields 252.

Figure 8:
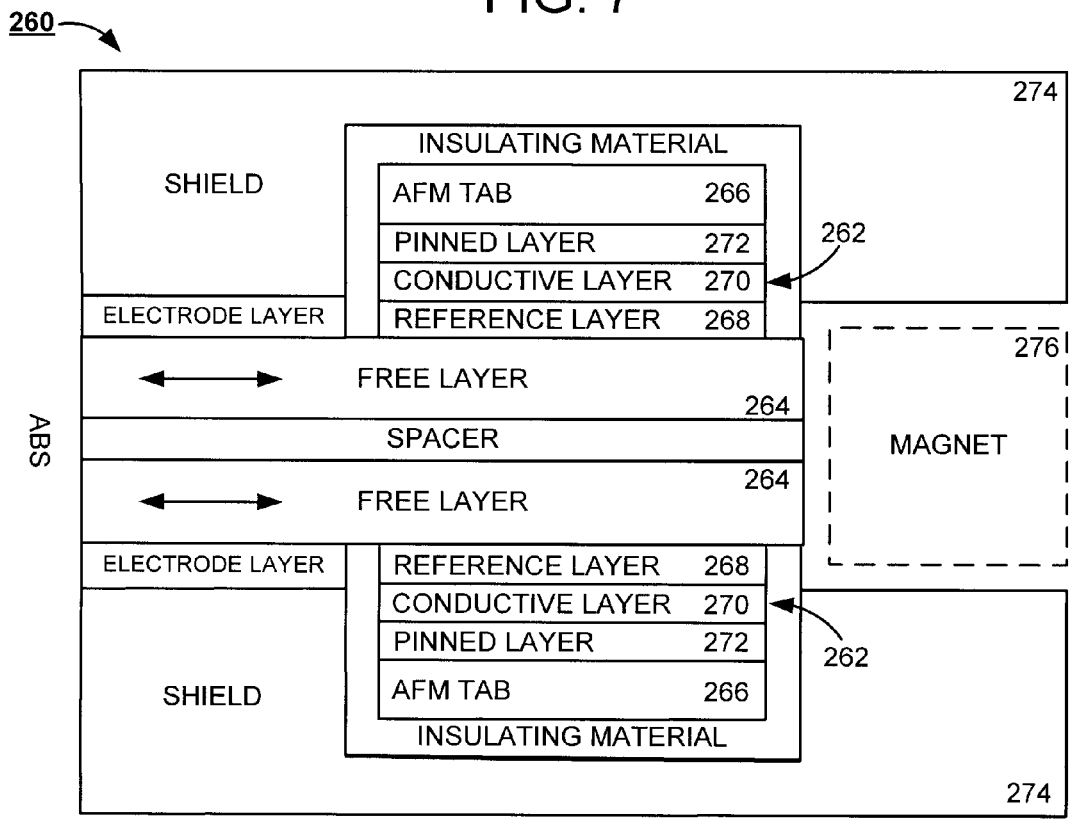
FIG. 8 provides an exemplary magnetic element constructed and operated in accordance with various embodiments of the present invention.

In FIG. 8, an exemplary magnetic element 260 is constructed with a synthetic antiferromagnet (SAF) 262 disposed between the free layers 264 and the AFM tabs 266. The SAF 262 can be configured as a single layer or as a lamination a ferromagnetic free reference layer 268, a conductive layer 270, and a magnetically pinned layer 272. The conductive layer 270 can further be disposed between the reference and pinned layers 268 and 272 to enable a net magnetization for the SAF 262. In some embodiments, the conductive layer 270 can be Ruthenium. Such a SAF configuration and placement between the AFM tab 266 and free layers 264 can further stabilize the free layers by enhancing the exchange bias field of the AFM tab 266.

In some embodiments, the $Co_xFe_{1-x}$, $Ni_xFe_{1-x}$, and $(Co_xFe_{1-x})_yB_{1-y}$ free multi-layer of FIGS. 4-5C can be used in the place of the SAF 262 and provide enhanced exchange bias fields when constructed with the $Co_xFe_{1-x}$ layer being directly coupled to the AFM tab 266. It should be noted that the shields 274 of the magnetic element 260 are shown, as modified, to accommodate a further reduction of thickness due to the inclusion of the SAF 262. It can be appreciated that the shields 284 can be configured in a number of different manners, such as having multiple areas of reduced thickness and housing a magnet 276 at the rear of the free layers opposite the ABS.

While the SAF 262 is shown in FIG. 8 to share a common areal extent with the AFM tab 266, such orientation is not required as various embodiments have the SAF 262 with an areal extent that is less than the areal extent of the free layers 264, but either bigger or smaller than the areal extent of the AFM tab 266. As such, the areal extent of the SAF 262, as measured along the top surface of the free layer 264, can be modified as desired to change the operational characteristics of the magnetic element 260.

With FIGS. 1-8, several AFM tabs have been presented which may or may not be connected as a common structure. In the magnetic element 280 of FIG. 9, a single AFM tab 282 is coupled to a single side of the pair of ferromagnetic free layers 284 and 286. As shown, the areal extent of the first free layer 284 is less than the areal extent of the second free layer 286 in order to allow the single AFM tab 282 to contact both free layers to influence a default magnetization and threshold magnetization. Manipulation of the default magnetization and the operation of the magnetic element 280 can be modified by adjusting the free layer differential distance 288. For example, increasing the differential distance 288 could provide more surface area of the AFM tab 282 in direct contact with the second free layer 286, or vice versa.

Various embodiments have the first and second free layers 284 and 286 being constructed of the same areal extent and subsequently undergoing a removal of a portion of the first free layer 284 and the spacer layer 290, such as by an etching process. However, the free layers 284 and 286 are not limited to the orientation shown in FIG. 9 as the first free layer 284 can have a greater areal extent than the second free layer 286.

The magnetic element 280, as displayed, has an asymmetric configuration in which the top shield 292 has a different reduction in thickness than the bottom shield 294. The asymmetry further extends to the shapes of the insulating material 296 and 298 that may or may not be attached to the shields 292 and 294. That is, the top shield 292 and top insulating material 296 disposed between the AFM tab 282 and the top shield transitions from a region of reduced thickness in the top shield with a taper as opposed to the 90° angle transition of the bottom shield 294 and bottom insulating material 298.

In some embodiments, the transition from first free layer 284 to second free layer 286 is tapered similarly to the AFM tab 282. Meanwhile in other embodiments, the bottom insulating material 298 has a thickness that is greater than that of the top insulating material 296 and free layers 284 and 286. The various configurations of the magnetic element 280 allow for modified construction and operation to accommodate a wide variety of uses while keeping a strong exchange bias field interaction that stabilizes the first and second free layers 284 and 286.

Figure 9:
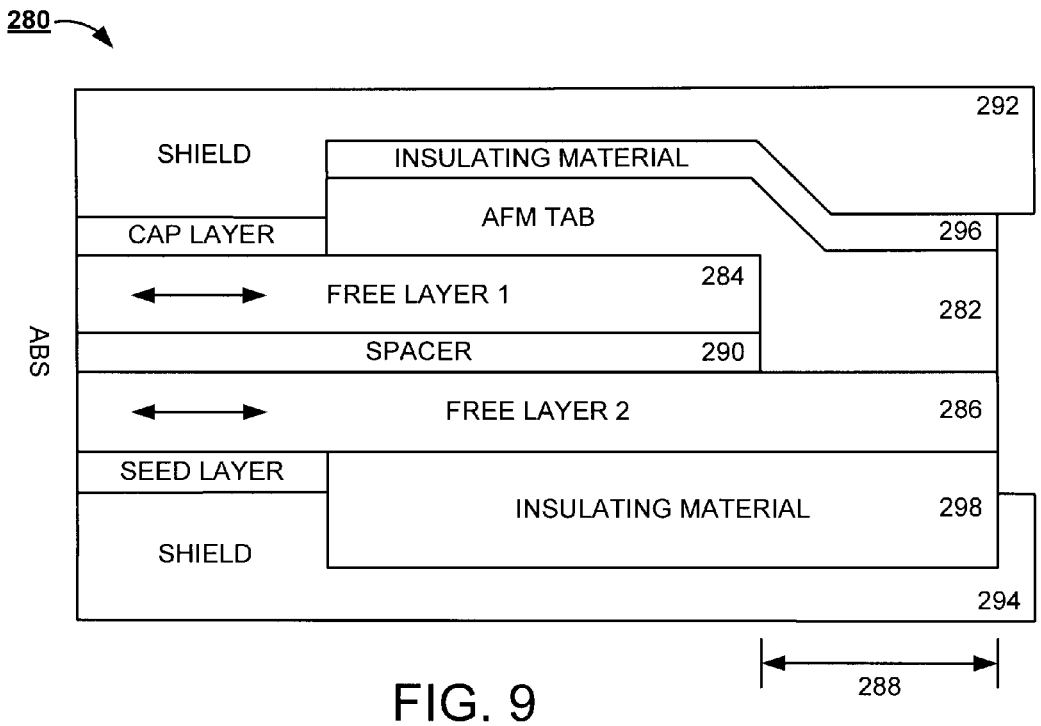
FIG. 9 shows an exemplary magnetic element constructed and operated in accordance with various embodiments of the present invention.
Figure 10:
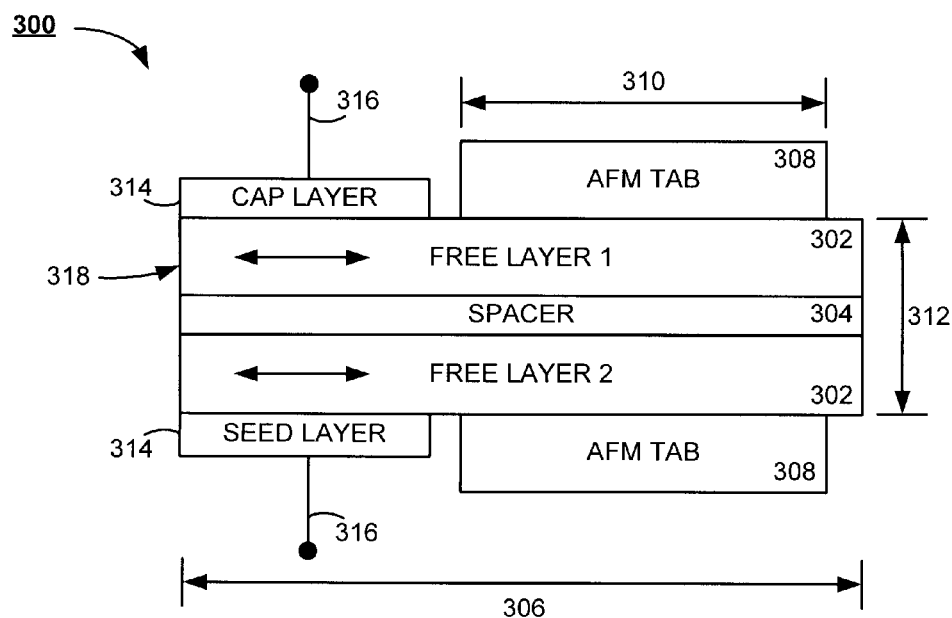
FIG. 10 provides an exemplary magnetic element constructed and operated in accordance with various embodiments of the present invention.

While the foregoing discussion has described the exemplary memory elements in the context of a read sensor of a data transducing head, it will be appreciated that such is not necessarily limiting. FIG. 10 generally illustrates a magnetic element 300 that can be used as a solid state memory cell in accordance with various embodiments of the present invention. With the magnetic elements of FIGS. 1 and 6-9, magnetic shielding material has been attached to the dual free layers via electrode layers to direct unwanted magnetic flux away from the free layers to improve stability and reliability of the element's magnetic sensing. However, the magnetic shields are not required for the operation of the various magnetic elements discussed above, as illustrated by the element 300 of FIG. 10.

Unlike traditional magnetoresistive transducers which encounter stray magnetic fields from a rotating media, a solid state memory cell is often affixed in an array and encounters minimal stray magnetic fields that require shielding. As such, the magnetic element 300 does not have shielding layers that can increase the overall thickness of the element 300. However, in some embodiments, magnetic shield layers are deposited over some or all of the dual free layers 302.

The magnetic element 300 configures the dual free layers 302 and non-magnetic spacer layer 304 with an extended stripe height that corresponds with a first areal extent 306 and promotes magnetic stability due to increased shape anisotropy. Each free layer 302 is coupled to an AFM tab 308 that continually contactingly engages a predetermined portion of the free layers 302 with a second areal extent 310. The antiferromagnetic properties of the AFM tab 308 are enhanced as the areal extent of the tab increases. That is, the AFM tab 308 can be configured with a variety of areal extents that result in more or less antiferromagnetic material contacting each free layer 302.

A larger AFM tab 308 areal extent can provide a greater exchange bias field that is uniformly applied to the free layers 302 due to the continuous contact of the tab 308. In the exemplary embodiment shown in FIG. 10, the AFM tabs 308 have an areal extent that is greater than half the thickness 312 and areal extent of the free layers 302. As further shown in FIG. 10, the AFM tabs 308 can be separated from the cap and seed electrode layers 314 that are each adapted to bring electric signals to and from the free layers 302 via leads 316.

In operation, the magnetic element 300 has improved stability due to the increased connection and exchange bias field interaction between the free layers 302 and the AFM tabs 308. Magnetic stability is further enhanced through the flow of electric signals through the electrode layers 314 and not the AFM tabs 308. That is, connection to the leads 316 and consequential reception of electric signals can affect the magnetic characteristics of the AFM tabs 308 and subsequently the exchange bias field interacting with the free layers 302. Thus, the electrical separation of the AFM tabs 308 and the leads 316 allow for a uniform exchange bias field that promotes magnetic stability in the free layers 302.

An exemplary embodiment of the magnetic element 300 can include the AFM tab 308 and at least one electrode layer being co-planar and each coupled to the first ferromagnetic free layer 302 in separated adjacency. Another exemplary embodiment constructs the AFM tab 308 a predetermined distance from a front surface 318 of the free and spacer layers 302 and 304. Regardless of the configuration of the magnetic element 300, the AFM tabs 308 can provide added magnetic stability with minimal increase in element thickness.

Figure 11:
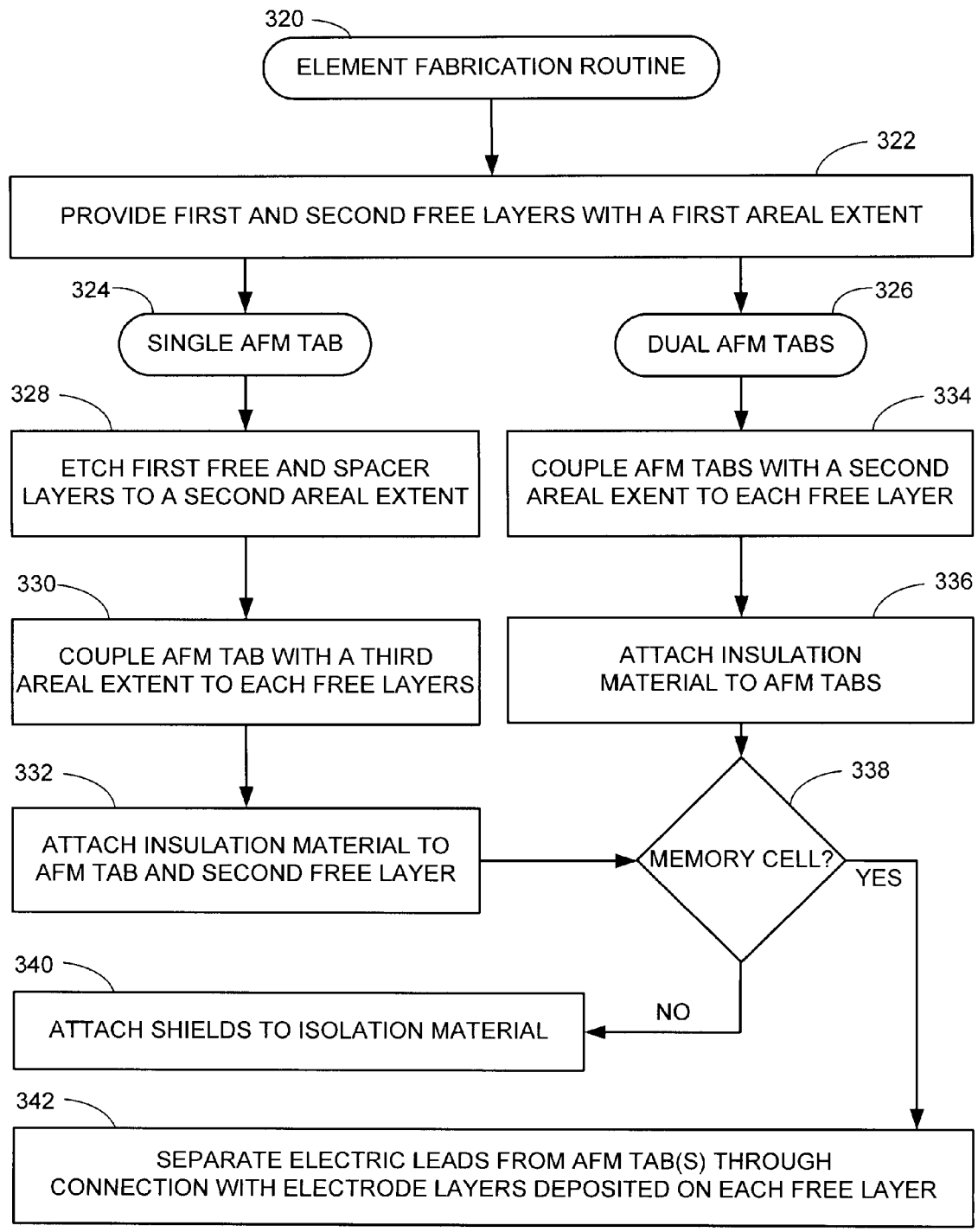
FIG. 11 shows a flowchart of an exemplary element fabrication routine carried out in accordance with various embodiments of the present invention.

FIG. 11 provides an exemplary element fabrication routine 320 conducted in accordance with various embodiments of the present invention. The routine 320 initially provides first and second ferromagnetic free layers with a first areal extent in step 322. As displayed in FIGS. 1-10, the ferromagnetic free layers can be separated by a spacer layer and each connected to an electrode layer, such as a cap or seed, with a smaller areal extent. In various embodiments, the free layers are each a lamination of $Co_xFe_{1-x}$, $Ni_xFe_{1-x}$, and $(Co_xFe_{1-x})_yB_{1-y}$ as shown in FIG. 4.

Subsequent to step 322, a decision can be made whether to create a magnetic element with a single tab with step 324 or with dual tabs with step 326. As shown in FIG. 9, a single AFM tab can influence both free layers through contacting engagement after the first free and spacer layers are etched to a second areal extent in step 328. The etching is not limited to a particular process, shape, or orientation as the second free layer could be etched instead of the first free layer.

With both free layers having a top surface exposed, an AFM tab that has a third areal extent is coupled on the top surface of each free layer in step 330. The AFM tab will then make continuous contact with both free layers and provide a uniform exchange bias field that will create a default magnetization for each free layer.

Step 332 attaches isolation material to the AFM tab and second free layer to reduce amplitude feedback loss from shunting resistance. The various configurations of the free layer after the etching of step 328 and AFM tab deposition of step 330 can provide an asymmetric orientation in which the shape of the top surface of the AFM tab is different from the shape of the bottom surface of the second free layer. As such, the shape of the insulation material on the AFM tab may differ from the shape of on the second free layer.

If a dual AFM tab configuration is chosen with step 326, a pair of AFM tabs with a fourth areal extent are coupled to the first and second free layers in step 334. As shown in FIGS. 1-7, the AFM tabs can each have the same areal extent and orientation on the free layer. However, such configuration is not required or limited as the AFM tabs can have different areal extents and be connected to different regions of the top surface of the free layers.

Step 336 attaches insulation material about each AFM tab to reduce shunting resistance. The insulation material can surround both AFM tabs and extend to contact the free layers, but such orientation is not required or limited. The routine 320 proceeds to determine in decision 338 whether or not to configure the element as a solid state memory cell is undertaken. In the event that construction of a memory cell is not chosen, magnetic shields are attached in step 340 to at least the insulating material. As discussed above, the shields can take various shapes, such as having a localized area of reduced thickness, and extend over part or all of the free layers and optionally around a rear mounted magnet.

A decision to create a memory cell proceeds to separate the AFM tab or tabs from incoming electrical leads by connecting the leads in step 342 to previously deposited electrode layers that are directly adjacent the free layers. The magnetic element of FIG. 9 generally illustrates how the AFM tabs can be electrically separated from the electrical pathway into the free layers.

It can be appreciated that the configuration and material characteristics of the magnetic element described in the present disclosure allows for advantageous magnetic stability while maintaining a small shield-to-shield spacing. The extended stripe height and areal extent of the dual free layers provides improved magnetic performance. Moreover, the AFM tabs offset from the ABS allow a small element thickness while enhancing magnetic stability of the free layers through a relatively large and uniform exchange bias interaction with the free layers. In addition, while the embodiments have been directed to magnetic sensing, it will be appreciated that the claimed invention can readily be utilized in any number of other applications, including data storage device applications.

For reference, as used herein the term "areal extent" will be understood consistent with the foregoing discussion to mean an accumulated surface area of an object that is oriented in facing relation to a longest orthogonal axis of the object, and will not take into account surface area not facing the axis. For example, a surface could have a U-shaped notch with surfaces facing opposite directions as well as straight up and the surface area would include the side facing surfaces but the areal extent, as viewed from above the notch, would not include the area of the side facing surfaces of the notch.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   a magnetically responsive stack with a first areal extent and comprising a spacer layer positioned between first and second ferromagnetic free layers; and
   at least one antiferromagnetic (AFM) tab offset from an air bearing surface and coupled to the first free layer on a surface thereof opposite the spacer layer, the AFM tab having a second areal extent that is less than the first areal extent.

2. The apparatus of claim 1, further comprising a first and second electrode layer each coupled to opposite sides of the magnetically responsive stack.

3. The apparatus of claim 2, wherein the AFM tab and the first electrode layer are co-planar and are both coupled to the first ferromagnetic free layer in different locations.

4. The apparatus of claim 1, further comprising a second AFM tab coupled to the second free layer on a surface thereof opposite the spacer layer.

5. The apparatus of claim 1, further comprising at least one magnetic shield coupled to a selected side of the stack.

6. The apparatus of claim 5, wherein the at least one magnetic shield has a region of reduced thickness that houses a portion of the AFM tab.

7. The apparatus of claim 5, wherein an insulating layer is disposed between the AFM tab and the magnetic shield.

8. The apparatus of claim 1, wherein the AFM tab contacts the first free layer an offset distance from the air bearing surface adjacent a first end of the stack.

9. The apparatus of claim 1, wherein the first and second free layers are each multi-layer structures.

10. The apparatus of claim 1, wherein a first metal insertion layer is located between the CoxFe1-x layer and the NixFe1-x layer and a second metal insertion layer is located between the NixFe1-x layer and the (CoxFe1-x)yB1-y layer.

11. The apparatus of claim 1, wherein a synthetic antiferromagnet is disposed between each free layer and AFM tab.

12. The apparatus of claim 11, characterized as a read sensor in a data transducing head.

13. An apparatus comprising:
    a magnetically responsive stack with a first areal extent and comprising a spacer layer positioned between first and second ferromagnetic free multi-layer structures that each comprise a CoxFe1-x layer coupled to the spacer layer, a $(Co_xFe_{1-x})_yB_{1-y}$ layer coupled to an AFM tab, and a $Ni_xFe_{1-x}$ layer disposed between the $Co_xFe_{1-x}$ and $(Co_xFe_{1-x})_yB_{1-y}$ layers; and the antiferromagnetic (AFM) tab coupled to the first free layer on a surface thereof opposite the spacer layer, the AFM tab having a second areal extent that is less than the first areal extent.

14. The apparatus of claim 13, wherein at least one of the multi-layer structures is a metal insertion layer that dilutes the magnetic moment of the free layers.

15. The apparatus of claim 13, characterized as a non-volatile solid state memory cell.

16. A magnetic element comprising:
a non-magnetic tunneling barrier layer disposed between a first ferromagnetic free layer and a second ferromagnetic free layer with a first areal extent; and
at least one antiferromagnetic (AFM) tab connected to the first or second free layers on a surface thereof opposite the spacer layer and spaced an offset distance away from a front surface of the first free ferromagnetic layer.

17. The magnetic element of claim 16, further comprising a magnet positioned adjacent the free layers and facing a side of the free layers opposite an air bearing surface.

18. The magnetic element of claim 16, wherein a first and second insulating material is coupled to the AFM tab and second free ferromagnetic layer.

19. The magnetic element of claim 16, wherein the AFM tab has a second areal extent less than the first areal extent.

20. The magnetic element of claim 16, wherein the free ferromagnetic layers are capable of storing a magnetic orientation as a non-volatile solid state memory cell.

\* \* \* \* \*